(No Model.) 2 Sheets—Sheet 1.

L. E. GURLEY.
TRANSIT INSTRUMENT WITH SOLAR ATTACHMENT.

No. 304,313. Patented Sept. 2, 1884.

WITNESSES:
John C. House
Edward P. Searle

INVENTOR:
Lewis E. Gurley (No Model.) 2 Sheets—Sheet 2.
L. E. GURLEY.
TRANSIT INSTRUMENT WITH SOLAR ATTACHMENT.
No. 304,313. Patented Sept. 2, 1884.
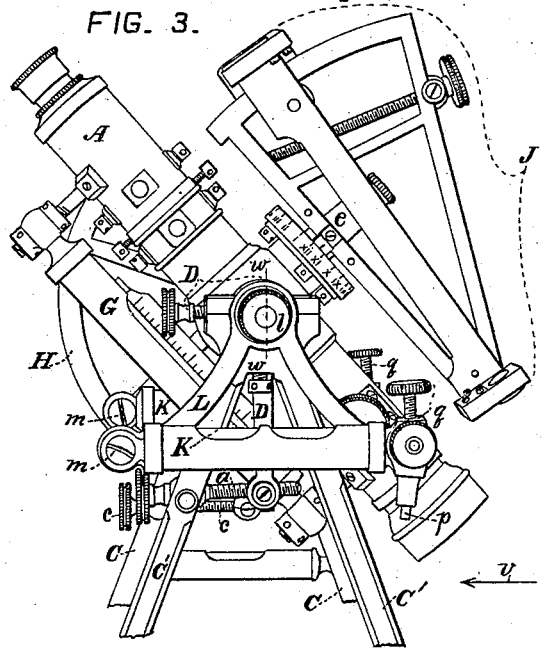
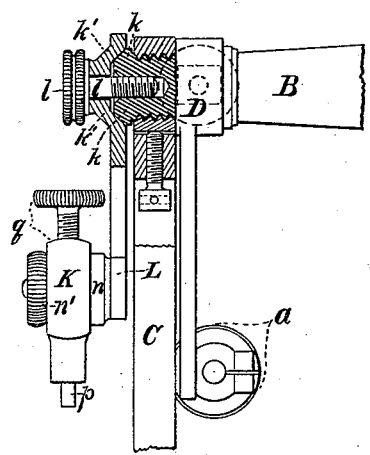
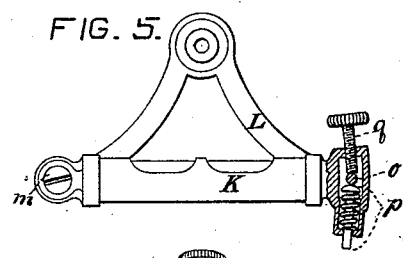
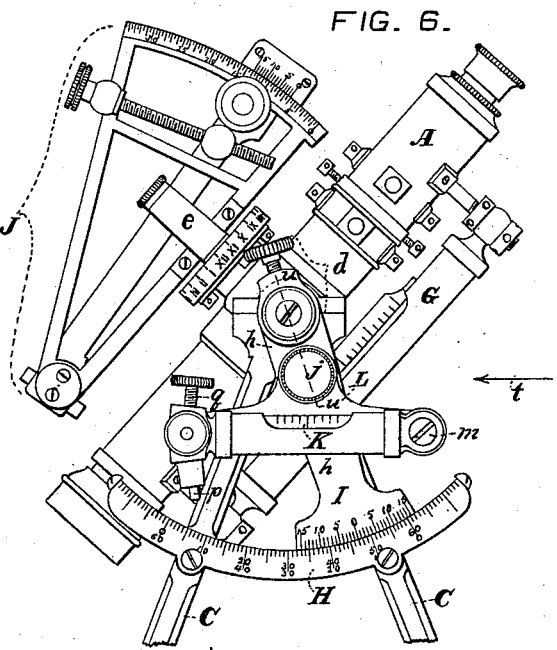
WITNESSES:
John C. House
Edward P. Searle
INVENTOR:
Lewis E. Gurley

UNITED STATES PATENT OFFICE.

LEWIS E. GURLEY, OF TROY, NEW YORK, ASSIGNOR TO HIMSELF AND WILLIAM GURLEY, OF SAME PLACE.

TRANSIT-INSTRUMENT WITH SOLAR ATTACHMENT.

SPECIFICATION forming part of Letters Patent No. 304,313, dated September 2, 1884.

Application filed May 29, 1884. (No model.)

*To all whom it may concern:*

Be it known that I, LEWIS E. GURLEY, a citizen of the United States, residing in the city of Troy, in the county of Rensselaer and State of New York, have invented new and useful Improvements in Transit-Instruments with Solar Attachments, of which the following is a specification, reference being had to the accompanying drawings.

This invention relates to engineers' and surveyors' transit-instruments, which have on the telescope a level parallel to the line of collimation, and a vertical graduated arc and a corresponding vernier or index, of which one is secured to and turns with the telescope or its supporting-axis, and the other is attached to one of the standards which support that axis, whereby the telescope can be adjusted to any required degree of inclination for running grades, and particularly when a solar attachment for finding the meridian is mounted on and turns with the telescope or its supporting-axis, and said graduated arc and index are used in adjusting the polar axis of the solar attachment to the proper inclination.

The general object of this invention is to furnish such a transit-instrument with a second spirit-level mounted on so as to turn with the supporting-axis of the telescope and readily adjustable thereon; so that the said second level can be quickly set horizontal whatever shall be the degree of inclination of the telescope or of the polar axis of the solar attachment; and so that when the said second level is thus set horizontal with the telescope or the polar axis at any particular degree of inclination, as determined by the said graduated arc and index, the instrument can then be taken to and set up at a different station and the telescope or polar axis adjusted to exactly the same degree of inclination, by first leveling the instrument by the level on the telescope, and then merely turning the telescope with its axis and second level until that level is horizontal, thereby avoiding the difficulties attending a careful examination of the graduated arc and index in readjusting the telescope or the polar axis to the required degree of inclination.

Figure 1:
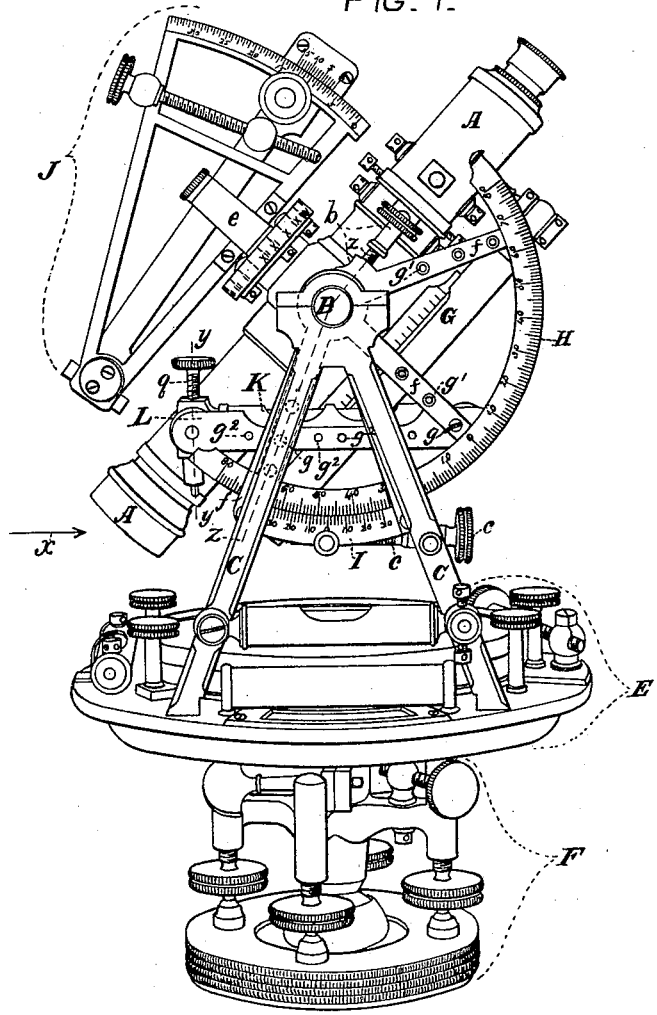
Figure 2:
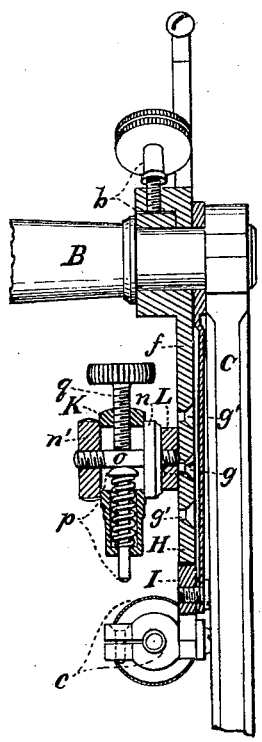

In the accompanying drawings, Figure 1 is a perspective view of one side of a transit-instrument which embodies one form of my invention, and has a solar attachment mounted on the axis of the telescope. Fig. 2 is an elevation, partly in section and on a larger scale, of a portion of the same instrument, the section being at about the lines $z\,z$ and $y\,y$ in Fig. 1, and viewed in the direction pointed by the arrow $x$ in the latter figure. Fig. 3 is a perspective view of the upper portion of the same transit-instrument with the same solar attachment, showing the side opposite to that represented in Fig. 1, and illustrating a generally-preferred mode of attaching the aforesaid second level. Fig. 4 is an elevation, partly in section and on a larger scale, of a portion of the same instrument, the section being at about the line $w\,w$ in Fig. 3, and viewed in the direction pointed by the arrow $v$ in that figure. Fig. 5 is a side elevation, partly in section, of the same second or inclination level and its holder represented in Figs. 3 and 4. Fig. 6 is a side view of the upper portion of a transit-instrument having a solar apparatus and an inclination-level applied to the instrument according to my invention. Fig. 7 is an elevation, partly in section, of a part of the same instrument represented in Fig. 6, the section being at about the line $u\,u$, and viewed in the direction indicated by the arrow $t$ in that figure.

A represents the telescope; B, its supporting-axis, and C C′ its supporting-standards; D, Figs. 3 and 4, a screw-clamp, and $a$ the tangent-screw for temporarily securing and adjusting the axis B to one of the standards; E, the horizontal circular plates and their attachments; F, the leveling-head; G, the level on the telescope and parallel to its optical axis; H, the vertical graduated arc, which in Figs. 1, 2, and 3 is adjustably secured by a screw-clamp, $b$, to the axis B, but in Figs. 6 and 7 is fast on the standard C; and I, the corresponding index or vernier, which in Figs. 1, 2, and 3 is suspended from the axis B and adjustably attached to the standard C by the tangent-screw $c$, but in Figs. 6 and 7 is adjustably secured to the axis B by a screw-clamp, $d$, all substantially the same as in numerous transit-instruments in common use.

J is a common solar attachment, having its polar axis $e$ secured to the axis B at right angles thereto and perpendicular to the line of collimation of the telescope, essentially as set forth in United States Patent, No. 72,687, and as heretofore embodied in many solar transits. In using such solar transits the vertical graduated arc H and its vernier I are employed in adjusting the polar axis $e$ of the solar attachment to the same inclination as the polar axis of the earth at any latitude. To do this the instrument is first carefully leveled by means of the leveling-head F and the level G on the telescope, so that the telescope shall be horizontal and the polar axis $e$ vertical. The zero of the vernier I is then adjusted to coincide with the zero of the arc H while the telescope is horizontal, and then the arc H in Figs. 1, 2, and 3, or the vernier I in Figs. 6 and 7 is clamped fast to the axis B of the telescope. Then the telescope and its attachments with the axis B are turned until the zero of the vernier I exactly coincides on the arc H with the particular degree and minute that is the complement of the latitude of the place, so that the polar axis $e$ will then have the same inclination as the polar axis of the earth at that latitude, and can be secured in that position by the screw-clamp D, Figs. 3 and 4, and tangent-screw $a$ until the meridian shall have been found by means of the instrument and solar attachment in the usual manner. Then the axis B is unclamped, so that the telescope can be used in running lines and with the arc H and index I in taking vertical angles. Heretofore in using such solar-transit instruments it has been necessary to repeat all those operations to readjust the polar axis to the same inclination at each station.

In order to greatly facilitate and expedite the readjustment of the polar axis to the same inclination after that axis is once adjusted to the proper inclination by the arc H and index I, as above set forth, I secure, by adjusting devices, to the axis B a second spirit-level, K, in a plane about at right angles to that axis, and in such relation to the arc H and index I that said level can be easily and quickly adjusted to a horizontal position and firmly fixed or secured to the axis B, when the polar axis $e$ is set at any proper inclination by the use of that arc and index. With the level K thus secured to the axis B the instrument can be used in running lines and in taking angles of elevation by the arc H and index I, and upon setting up the instrument in a new place the polar axis can be very easily and quickly readjusted to the same inclination, without any use or examination of said arc and index, by first leveling the instrument by the level G on the telescope, and then merely turning the telescope with the axis B, solar attachment, and level K, all together, about that axis until the latter level is horizontal.

In carrying out this invention I secure the inclination-level K more or less directly to the axis B by various suitable adjusting devices. Thus, for illustration, in the instrument represented by Figs. 1, 2, and 3 the arc H is adjustably secured to the axis B by a screw-clamp $b$, Fig. 2, and in Figs. 1 and 2 the level K is shown secured to the arms $f$ of the arc H by screws $g$ fitting in corresponding holes, $g'$ and $g^2$, in said arms and in a holder, L, to which the level K is adjustably secured. By means of the screws $g$ and the sets of holes $g'$ $g^2$ at different places in the arms $f$ and holder L the level K can be secured at different inclinations on the arc H, according to whatever few degrees of latitude shall embrace the locality of the survey to be made, and by means of the adjusting devices by which the level K is secured to its holder L that level can be quickly and exactly adjusted horizontally at whatever particular degree and minute of such few degrees shall be indicated on the arc H by its vernier.

In Figs. 6 and 7 the holder L of the level K is adjustably secured to the arm $h$ of the vernier I by corresponding male and female cones, $i$ $i'$, Fig. 7, formed on the parts $h$ and L, and held together by a clamp-screw, $j$, whereby the level K can be very quickly adjusted into a horizontal or nearly horizontal position, whatever shall be the position of the index I in respect to the graduations on the arc H, and whatever shall be the inclination of the telescope or of the polar axis of the instrument. However, in order to adjustably secure the level K to the axis B without the intervention of any part of either the arc H or its index I, so that said arc or index can be loosened on the axis B and the latter then turned without moving the index or the arc, and so that the arc or the index may be turned about the axis without altering the position of the level K in respect to that axis, I adjustably secure the holder L of that level directly to the axis B by a suitable clamping device—as, for instance, by corresponding male and female cones, $k$ $k'$, Figs. 3 and 4, one on said holder and the other on the end of the axis, and held together by a clamping-screw, $l$, whereby the level K can be almost instantly adjusted into a horizontal or nearly horizontal position, whatever shall be the position of the arc H or index I, or the inclination of the telescope or of the polar axis.

In order that the level K may be easily and quickly adjusted exactly horizontal whenever it shall be brought nearly horizontal by the adjustment of its holder L, as above described, I secure that level to the holder by suitable adjusting devices. In the drawings the level K is shown adjustably secured to the holder L by a pivot-stud, $m$, Figs. 3, 5, 6, at one end part, and the other end part of the level fitting freely between side bearings, $n$ $n'$, Figs. 2 and 4, on the holder, and a horizontal stud, $o$, fast on the holder, and fitting between the ends of the spring-bolt $p$ and the adjusting-screw $q$, mounted on the level, so that by merely turning the screw $q$ to and fro the adjacent end of the level will be raised and lowered on the holder. The stud $o$ can be fast on the level and the parts $p$ and $q$ mounted on the holder with like results, and other suitable known or equivalent devices can be employed in quickly and accurately adjusting the inclination-level upon its holder in carrying out my invention.

In the drawings the polar axis of the solar attachment is arranged perpendicular to the optical axis of the telescope of the transit-instrument; but similar transit-instruments are sometimes provided with solar attachments arranged on the telescope or its supporting-axis with the polar axis of the solar attachment parallel to the optical axis of the telescope.

In carrying out my present invention I apply the inclination-level and its adjusting devices, essentially as above described, to such solar transits as have the polar axis parallel to the optical axis of the telescope, as well as to such solar transits as have the optical axis of the telescope perpendicular to the polar axis of the solar device.

It will be evident to civil engineers and surveyors that the above-described combination of the inclination-level and the accompanying adjusting devices with a transit-instrument having a level on the telescope and a vertical graduated arc and vernier applied, as herein set forth, is very useful, and will facilitate and expedite the resetting of the telescope at any particular inclination to which the inclination-level K shall have been adjusted in running long grades for drains and inclined ways when no solar device is used or combined with the transit-instrument.

I claim as my invention—

1. A transit-instrument having on its telescope a level parallel to the line of collimation of the telescope, a vertical graduated arc and a corresponding vernier, of which one is mounted on and turns with the axis of the telescope, and the other is attached to one of the standards supporting that axis, a solar device mounted on and turning with the telescope or its axis, and an inclination-level supported by and turning with the axis of the telescope, and adjustable at different angles to the line of collimation of the telescope and to the polar axis of the solar device, substantially as described.

2. A transit-instrument having on its telescope a level parallel to the line of collimation of the telescope, a vertical graduated arc and a corresponding vernier, of which one is secured to and turns with the axis of the telescope, and the other is attached to one of the standards supporting that axis, a holder supported by and turning with the axis of the telescope and adjustable in an arc of a circle at right angles to that axis, and an inclination-level mounted on said adjustable holder, and adjustable thereon to different angles in respect to the line of collimation of the telescope, substantially as described.

3. A transit-instrument having on its telescope a level parallel to the line of collimation of the telescope, a vertical graduated arc and a corresponding vernier, of which one is secured to and turns with the axis of the telescope, and the other is attached to one of the standards supporting that axis, a holder separate from said arc and from said vernier and secured to the axis of the telescope, and adjustable circularly thereon by means substantially as described, and an inclination-level secured to said adjustable holder by adjusting devices, substantially as set forth.

In testimony whereof I hereunto set my hand, in the presence of two subscribing witnesses, this 26th day of May, 1884.

LEWIS E. GURLEY.

Witnesses:
JOHN C. HOUSE,
EDWARD P. SEARLE.